(12) United States Patent
Park et al.

(10) Patent No.: US 7,349,050 B2
(45) Date of Patent: Mar. 25, 2008

(54) ULTRAVIOLET IRRADIATING DEVICE AND METHOD OF MANUFACTURING LIQUID CRYSTAL DISPLAY DEVICE USING THE SAME

(75) Inventors: Moo Yeol Park, Taegu-Kwangyokshi (KR); Sung Su Jung, Taegu-Kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/184,077

(22) Filed: Jun. 28, 2002

(65) Prior Publication Data

US 2003/0147032 A1    Aug. 7, 2003

(30) Foreign Application Priority Data

Feb. 7, 2002    (KR) .................. 2002-7130

(51) Int. Cl.
*G02F 1/1337* (2006.01)

(52) U.S. Cl. ........................ 349/124; 349/127

(58) Field of Classification Search ............. 349/124, 349/123, 126, 129, 8, 127; 428/1.2
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,604,615 A * | 2/1997 | Iwagoe et al. | 349/124 |
| 5,608,550 A * | 3/1997 | Epstein et al. | 349/57 |
| 5,636,043 A * | 6/1997 | Uemura et al. | 349/156 |
| 5,642,214 A | 6/1997 | Ishii et al. | |
| 5,680,185 A * | 10/1997 | Kobayashi et al. | 349/88 |
| 5,680,189 A | 10/1997 | Shimizu et al. | |
| 5,742,370 A | 4/1998 | Kim et al. | |

(Continued)

FOREIGN PATENT DOCUMENTS

CN    1295311    5/2001

(Continued)

*Primary Examiner*—Ahshik Kim
(74) *Attorney, Agent, or Firm*—McKenna Long & Aldridge LLP

(57) ABSTRACT

A UV irradiating device and a method of manufacturing an LCD device using the same are disclosed. The UV irradiating device includes a UV light source part having a UV lamp and a reflecting plate, a support supporting the UV light source part, and a stage on which a substrate is placed, the UV light source being irradiated at a tilt angle upon the substrate. The UV is irradiated upon the substrate on which the UV sealant is formed, so that a sealant can be hardened even if a light-shielding layer or a metal line layer are formed between a UV irradiating surface and the UV sealant.

18 Claims, 14 Drawing Sheets

U.S. PATENT DOCUMENTS

| | | | |
|---|---|---|---|
| 5,757,451 A | 5/1998 | Miyazaki et al. | |
| 5,767,935 A * | 6/1998 | Ueda et al. | 349/112 |
| 5,783,338 A * | 7/1998 | Cho | 430/7 |
| 5,798,809 A * | 8/1998 | Nakamura et al. | 349/119 |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,889,571 A * | 3/1999 | Kim et al. | 349/124 |
| 5,934,780 A * | 8/1999 | Tanaka | 362/19 |
| 5,936,688 A * | 8/1999 | Tsuda et al. | 349/113 |
| 5,952,678 A | 9/1999 | Ashida | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,046,793 A | 4/2000 | Tanaka et al. | |
| 6,055,035 A | 4/2000 | von Gutfeld et al. | |
| 6,163,357 A | 12/2000 | Nakamura | |
| 6,166,793 A * | 12/2000 | Hayashi et al. | 349/113 |
| 6,175,397 B1 * | 1/2001 | Inoue et al. | 349/86 |
| 6,191,836 B1 * | 2/2001 | Woo et al. | 349/124 |
| 6,206,527 B1 * | 3/2001 | Suzuki | 359/858 |
| 6,219,126 B1 | 4/2001 | von Gutfeld | |
| 6,226,066 B1 * | 5/2001 | Reznikov et al. | 349/124 |
| 6,226,067 B1 | 5/2001 | Nishiguchi et al. | |
| 6,236,445 B1 | 5/2001 | Foschaar et al. | |
| 6,295,110 B1 * | 9/2001 | Ohe et al. | 349/124 |
| 6,304,306 B1 | 10/2001 | Shiomi et al. | |
| 6,304,311 B1 | 10/2001 | Egami et al. | |
| 6,307,609 B1 * | 10/2001 | Gibbons et al. | 349/124 |
| 6,313,894 B1 * | 11/2001 | Sekine et al. | 349/88 |
| 6,337,730 B1 | 1/2002 | Ozaki et al. | |
| 6,339,459 B1 * | 1/2002 | Ichikawa et al. | 349/95 |
| 6,414,733 B1 | 7/2002 | Ishikawa et al. | |
| 6,433,850 B2 * | 8/2002 | Reznikov et al. | 349/124 |
| 6,478,429 B1 * | 11/2002 | Aritake et al. | 353/31 |
| 6,535,260 B1 * | 3/2003 | Tasaka et al. | 349/124 |
| 6,639,720 B2 * | 10/2003 | Choi et al. | 359/494 |
| 6,642,992 B2 * | 11/2003 | Kim | 349/191 |
| 6,696,114 B1 * | 2/2004 | Kawatsuki et al. | 428/1.2 |
| 2001/0021000 A1 | 9/2001 | Egami | |

FOREIGN PATENT DOCUMENTS

| | | |
|---|---|---|
| DE | 103 52 413 A1 | 6/2004 |
| EP | 1003066 A1 | 5/2000 |
| JP | 51-065656 | 6/1976 |
| JP | 57038414 | 3/1982 |
| JP | 57088428 | 6/1982 |
| JP | 58027126 | 2/1983 |
| JP | 59-057221 | 4/1984 |
| JP | 59-195222 | 11/1984 |
| JP | 60-111221 | 6/1985 |
| JP | 60164723 | 8/1985 |
| JP | 60217343 | 10/1985 |
| JP | 61007822 | 1/1986 |
| JP | 61055625 | 3/1986 |
| JP | S62-054225 | 3/1987 |
| JP | S62-054228 | 3/1987 |
| JP | S62-054229 | 3/1987 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05127179 | 5/1993 |
| JP | 05-154923 | 6/1993 |
| JP | 05265011 | 10/1993 |
| JP | 05281557 | 10/1993 |
| JP | 05281562 | 10/1993 |
| JP | H06-018829 | 1/1994 |
| JP | 06051256 | 2/1994 |
| JP | H06-064229 | 3/1994 |
| JP | 06148657 | 5/1994 |
| JP | 6160871 | 6/1994 |
| JP | H06-194637 | 7/1994 |
| JP | 06-235925 | 8/1994 |
| JP | 06265915 | 9/1994 |
| JP | 06-313870 | 11/1994 |
| JP | 07-084268 | 3/1995 |
| JP | 07128674 | 5/1995 |
| JP | 07181507 | 7/1995 |
| JP | H07-275770 | 10/1995 |
| JP | H07-275771 | 10/1995 |
| JP | 07-333624 | 12/1995 |
| JP | H08-076133 | 3/1996 |
| JP | 08-101395 | 4/1996 |
| JP | 08095066 | 4/1996 |
| JP | 8101395 | 4/1996 |
| JP | 08106101 | 4/1996 |
| JP | H08-110504 | 4/1996 |
| JP | H08-136937 | 5/1996 |
| JP | 08171094 | 7/1996 |
| JP | 08190099 | 7/1996 |
| JP | H08-173874 | 7/1996 |
| JP | 8210911 | 8/1996 |
| JP | 08240807 | 9/1996 |
| JP | 08-304836 | 11/1996 |
| JP | 09005762 | 1/1997 |
| JP | 09026578 | 1/1997 |
| JP | H09-001026 | 1/1997 |
| JP | 09-061829 | 3/1997 |
| JP | 09-073096 | 3/1997 |
| JP | 09073075 | 3/1997 |
| JP | 09073096 | 3/1997 |
| JP | 9096822 | 4/1997 |
| JP | H09-094500 | 4/1997 |
| JP | 09127528 | 5/1997 |
| JP | 09230357 | 9/1997 |
| JP | 09281511 | 10/1997 |
| JP | 09311340 | 12/1997 |
| JP | 10104590 A | 4/1998 |
| JP | 10123537 | 5/1998 |
| JP | 10123538 | 5/1998 |
| JP | 10142616 | 5/1998 |
| JP | 10-154658 | 6/1998 |
| JP | 10-177178 | 6/1998 |
| JP | H10-174924 | 6/1998 |
| JP | 10221700 | 8/1998 |
| JP | 10282512 | 10/1998 |
| JP | 10-333157 | 12/1998 |
| JP | 10-333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11-133438 | 5/1999 |
| JP | 11-142864 | 5/1999 |
| JP | 11174477 | 7/1999 |
| JP | 11212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11344714 | 12/1999 |
| JP | 2000-002879 | 1/2000 |

| | | | | | | |
|---|---|---|---|---|---|---|
| JP | 2000029035 | 1/2000 | | JP | 2001356354 | 12/2001 |
| JP | 2000-056311 | 2/2000 | | JP | 2002014360 | 1/2002 |
| JP | 2000-066165 | 3/2000 | | JP | 2002023176 | 1/2002 |
| JP | 2000-066218 | 3/2000 | | JP | 2002049045 | 2/2002 |
| JP | 2000-093866 | 4/2000 | | JP | 2002-079160 | 3/2002 |
| JP | 2000-137235 | 5/2000 | | JP | 2002082340 | 3/2002 |
| JP | 3000-147528 | 5/2000 | | JP | 2002090758 A | 3/2002 |
| JP | 2000-193988 | 7/2000 | | JP | 2002090759 | 3/2002 |
| JP | 2000206701 | 7/2000 | | JP | 2002090760 | 3/2002 |
| JP | 2000-241824 | 9/2000 | | JP | 2002-122870 | 4/2002 |
| JP | 2000-284295 | 10/2000 | | JP | 2002107740 | 4/2002 |
| JP | 2000-292799 | 10/2000 | | JP | 2002122872 | 4/2002 |
| JP | 2000-310759 | 11/2000 | | JP | 2002122873 | 4/2002 |
| JP | 2000-310784 | 11/2000 | | JP | 2002-131762 | 5/2002 |
| JP | 2000-338501 | 12/2000 | | JP | 2002-139734 | 5/2002 |
| JP | 2001-005401 | 1/2001 | | JP | 2002-156518 | 5/2002 |
| JP | 2001-005405 | 1/2001 | | JP | 2002-169166 | 6/2002 |
| JP | 2001-013506 | 1/2001 | | JP | 2002-169167 | 6/2002 |
| JP | 2001-033793 | 2/2001 | | JP | 2002-182222 | 6/2002 |
| JP | 2001-042341 | 2/2001 | | JP | 2002080321 | 6/2002 |
| JP | 2001-051284 | 2/2001 | | JP | 2002202512 | 7/2002 |
| JP | 2001-066615 | 3/2001 | | JP | 2002202514 | 7/2002 |
| JP | 2001-091727 | 4/2001 | | JP | 2002214626 | 7/2002 |
| JP | 2001-117109 | 4/2001 | | JP | 2002-229042 | 8/2002 |
| JP | 2001117105 | 4/2001 | | JP | 2002-236276 | 8/2002 |
| JP | 2001-133745 | 5/2001 | | JP | 2002-258299 | 8/2002 |
| JP | 2001-133799 | 5/2001 | | JP | 2002229471 A | 8/2002 |
| JP | 2001133794 | 5/2001 | | JP | 2002-236292 | 9/2002 |
| JP | 2001142074 | 5/2001 | | JP | 2002-277865 | 9/2002 |
| JP | 2001147437 | 5/2001 | | JP | 2002-277866 | 9/2002 |
| JP | 2001-166272 | 6/2001 | | JP | 2002-277881 | 9/2002 |
| JP | 2001-166310 | 6/2001 | | JP | 2002-287156 | 10/2002 |
| JP | 2001154211 | 6/2001 | | JP | 2002-296605 | 10/2002 |
| JP | 2001-183683 | 7/2001 | | JP | 2002-311438 | 10/2002 |
| JP | 2001-209052 | 8/2001 | | JP | 2002-311440 | 10/2002 |
| JP | 2001-209056 | 8/2001 | | JP | 2002-311442 | 10/2002 |
| JP | 2001-209057 | 8/2001 | | JP | 2002-323687 | 11/2002 |
| JP | 2001-209058 | 8/2001 | | JP | 2002-323694 | 11/2002 |
| JP | 2001-209060 | 8/2001 | | JP | 2002-333628 | 11/2002 |
| JP | 2001-222017 | 8/2001 | | JP | 2002-333635 | 11/2002 |
| JP | 2001-235758 | 8/2001 | | JP | 2002-333843 | 11/2002 |
| JP | 2001-215459 | 9/2001 | | JP | 2002-341329 | 11/2002 |
| JP | 2001255542 | 9/2001 | | JP | 2002-341355 | 11/2002 |
| JP | 2001264782 | 9/2001 | | JP | 2002-341356 | 11/2002 |
| JP | 2001-201750 | 10/2001 | | JP | 2002-341357 | 11/2002 |
| JP | 2001-272640 | 10/2001 | | JP | 2002-341358 | 11/2002 |
| JP | 2001-281675 | 10/2001 | | JP | 2002-341359 | 11/2002 |
| JP | 2001-281678 | 10/2001 | | JP | 2002-341362 | 11/2002 |
| JP | 2001-282126 | 10/2001 | | KR | 2000-0035302 A1 | 6/2000 |
| JP | 2001-305563 | 10/2001 | | KR | 1020010040083 A | 5/2001 |
| JP | 2001-330837 | 11/2001 | | | | |
| JP | 2001330840 | 11/2001 | | | | |
| JP | 2001-356353 | 12/2001 | | | | |

\* cited by examiner hardening rate of sealant (%)

| range of sealant Δx (μm) | tilt angle θ (°) | | | | |
|---|---|---|---|---|---|
| | 0 | 15 | 30 | 45 | 60 |
| 0 ~ 260 | 56.8 | 77.8 | 87.7 | 98.7 | 99.1 |
| 260 ~ 520 | 38.4 | 78.7 | 81.7 | 93.7 | 98.2 |

ULTRAVIOLET IRRADIATING DEVICE AND METHOD OF MANUFACTURING LIQUID CRYSTAL DISPLAY DEVICE USING THE SAME

This application claims the benefit of Korean Patent Application No. P2002-7130 filed on Feb. 7, 2002, which is hereby incorporated by reference as if fully set forth herein.

This application incorporates by reference two applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", now U.S. Pat. No. 7,102,726, as if fully set forth herein.

BACKGROUND OF THE INVENTION

1. Field of the Invention

The present invention relates to a liquid crystal display (LCD) device, and more particularly, to an ultraviolet (UV) irradiating device for hardening a sealant that is at least partially curable by the application of ultraviolet light and a method of manufacturing an LCD device using the same.

2. Discussion of the Related Art

Generally, ultra thin flat panel displays having a display screen with a thickness of several centimeters or less, and in particular, flat panel LCD devices, are widely used in monitors for notebook computers, spacecraft, and aircraft because such LCD devices have low power consumption and are easy to carry.

Such an LCD devices include a lower substrate, an upper substrate, and a liquid crystal layer. A thin film transistor (TFT) and a pixel electrode are formed on the lower substrate. The upper substrate is formed to oppose the lower substrate. A light-shielding layer, a color filter layer, and a common electrode are formed on the upper substrate. The common electrode may also be formed on the lower substrate for an in plane switching LCD device. The liquid crystal layer is between the lower and upper substrates. In operation, an electric field is formed between the lower and upper substrates by the pixel electrode and the common electrode so that the liquid crystal layer is "driven" to be aligned according to the direction of the electric field. Light transmittivity is controlled through driving liquid crystal layer so that a picture image is displayed.

In the aforementioned LCD device, to form a liquid crystal layer between lower and upper substrates, a vacuum injection method based on capillary phenomenon and pressure difference has been conventionally used.

A related art method of manufacturing an LCD device based on a vacuum injection method will be described.

First, a lower substrate provided with a TFT and a pixel electrode and an upper substrate provided with a light-shielding layer, a color filter layer, and a common electrode are manufactured.

To maintain a uniform cell gap between the lower and upper substrates, a spacer is formed on one of the lower and upper substrates. A sealant is formed on the corner of one substrate so that a liquid crystal is prevented from leaking out and both substrates are bonded to each other. At this time, a thermal hardening sealant such as an epoxy sealant is used as the sealant.

The lower and upper substrates are bonded to each other. The epoxy sealant is manufactured by mixing epoxy resin with an initiator. If the epoxy sealant is heated, the epoxy resin activated by the initiator is polymerized by cross-linkage so as to provide excellent adherence.

The bonded substrates are placed in a vacuum chamber to maintain the substrates under the vacuum state and then are dipped in the liquid crystal. If the substrates are maintained under the vacuum state, the liquid crystal is injected into the substrates by capillary action.

Nitrogen gas ($N_2$) is injected into the vacuum chamber after the liquid crystal is appropriately filled in the substrates, causing a pressure difference between the inside of the substrates and the outside of the substrates, and liquid crystal is thereby filled into empty spaces between the substrates. Thus, the liquid crystal layer is finally formed between both substrates.

However, such a vacuum injection method has a problem in that it takes a relatively long time to inject the liquid crystal between the substrates, particularly for devices having a large display area, thereby reducing the productivity.

To solve such a problem, a liquid crystal application method has been developed. A brief description is included here to assist in understanding the present invention and will now be described with reference to FIGS. 1A to 1D.

As shown in FIG. 1A, a lower substrate 1 and an upper substrate 3 are prepared. A plurality of gate and data lines (not shown) are formed on the lower substrate 1. The gate lines cross the data lines to define a pixel region. A thin film transistor (not shown) is formed at each crossing point between the gate and data lines. A pixel electrode (not shown) connected with the thin film transistor is formed in the pixel region.

A light-shielding layer (not shown) is formed on the upper substrate 3 to prevent light from leaking out from the gate and data lines and the thin film transistor. Color filter layers (not shown) of red(R), green(G), and blue(B) are formed on the light-shielding layer, and a common electrode (not shown) is formed on the color filter layers. In the case of an in plane switching LCD device, the common electrode is provided on the lower substrate. An alignment film (not shown) is formed on at least one of the lower substrate 1 and the upper substrate 3 to initially align a liquid crystal to be applied.

As shown in FIG. 1B, a sealant 7 is formed on the lower substrate 1 and a liquid crystal 5 is applied thereon, so that a liquid crystal layer is formed. A spacer (not shown) is disposed on the upper substrate 3 to maintain a cell gap.

As shown in FIG. 1C, the lower substrate 1 and the upper substrate 3 are bonded each other.

At this time, in the method of manufacturing the LCD device based on the vacuum injection method, a bonding process of both substrates is performed before the liquid crystal is injected. On the other hand, in the method of manufacturing the LCD device based on the liquid crystal application method, a bonding process of both substrates is performed after the liquid crystal 5 is applied. Therefore, if a thermal hardening sealant is used as the sealant 7, the liquid crystal expand and 7 may flow out when it is heated. For this reason, a problem arises in that the liquid crystal 5 is contaminated.

Therefore, in the method of manufacturing the LCD based on the liquid crystal application method, a sealant at least partially curable by ultraviolet (UV) light is used as the sealant 7.

As shown in FIG. 1D, a UV light source 9 is vertically irradiated so that the sealant 7 is hardened.

Meanwhile, FIGS. 2A to 2D illustrate a difference of a hardening rate of a sealant according to a pattern of a light-shielding layer and the sealant formed on a substrate.

As shown in FIG. 2A, the sealant 7 is formed outside a region where the light-shielding layer 8 is formed. In this case, UV light is incident upon the sealant 7 even if the UV light is irradiated on the upper substrate 3 where the light-shielding layer 8 is formed.

However, as shown in FIG. 2B, if the sealant 7 is formed to overlap the light-shielding layer 8, the UV light is not incident upon the sealant in the overlapped region. For this reason, the sealant in the overlapped region is not hardened. Thus, adherence between the lower substrate 1 and the upper substrate 3 is reduced.

As shown in FIG. 2C, if the sealant 7 is formed inside the light-shielding layer 8, the UV light is incident upon the upper substrate 3, the light-shielding layer 8 is formed, and the sealant 7 is not irradiated with the UV light. Therefore, the UV light should also be irradiated upon the lower substrate 1 to sufficiently cure the sealant 7 from below. However, as shown in FIG. 2D, if a metal line layer such as a gate line 6a and/or a data line 6b on the lower substrate 1 overlaps the sealant 7, the UV light is not incident upon the sealant 7 in region A. For this reason, the sealant 7 is not hardened, and adherence between the lower substrate 1 and the upper substrate 3 is reduced.

In other words, if the light-shielding layer or the metal line layer is formed overlapping the sealant 7, the UV light is not incident upon the sealant. As a result, adherence between the lower substrate and the upper substrate is reduced.

SUMMARY OF THE INVENTION

Accordingly, the present invention is directed to a UV irradiating device and a method of manufacturing an LCD device using the same that substantially obviates one or more of the problems due to limitations and disadvantages of the related art.

An advantage of the present invention is to provide a UV irradiating device for hardening a sealant and a method of manufacturing an LCD device using the same even if a light-shielding layer or a metal line layer are formed between a UV irradiating surface and a UV sealant.

Additional advantages and features of the invention will be set forth in the description which follows, and in part will be apparent from the description, or may be learned by practice of the invention. These other advantages of the invention will be realized and attained by the structure particularly pointed out in the written description and claims hereof as well as the appended drawings.

To achieve these and other advantages and in accordance with the purpose of the present invention, as embodied and broadly described, a UV irradiating device according to the present invention includes a UV light source part having a UV lamp and a reflecting plate, a support supporting the UV light source part, and a substrate stage on which a substrate is placed, the UV light source being irradiated at a tilt angle upon the substrate.

To irradiate the UV light source upon the substrate stage at a tilt angle, the support is formed at a tilt angle with respect to a horizontal plane, the substrate stage is formed at a tilt angle with respect to a horizontal plane, or the reflecting plate is formed to allow the light source to be reflected at a tilt angle.

In another aspect of the present invention, a method of manufacturing an LCD includes: preparing lower and upper substrates; forming a UV sealant on one of the lower and upper substrates; applying a liquid crystal on one of the lower and upper substrates; attaching the lower and upper substrates to each other; and irradiating UV upon the attached substrate at a tilt angle.

In an embodiment of the present invention, the UV light is irradiated at a tilt angle upon the substrate where the UV sealant is formed, so that the sealant can be hardened even if a light-shielding layer or a metal line layer is formed between a UV irradiating surface and the sealant.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiment of the present invention, example of which is illustrated in the accompanying drawings. Wherever possible, the same reference numbers will be used throughout the drawings to refer to the same or like parts.

Figure 1A:
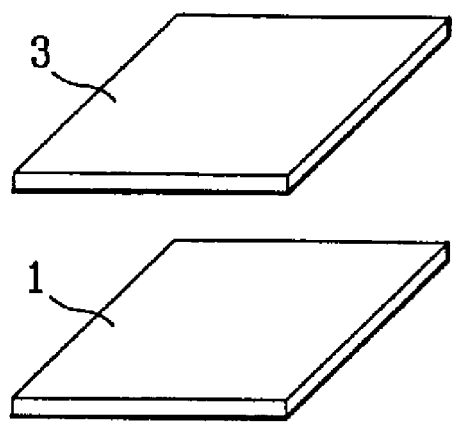
FIGS. 1A to 1D are perspective views illustrating a method of manufacturing an LCD device according to a related art liquid crystal application method.
Figure 1B:
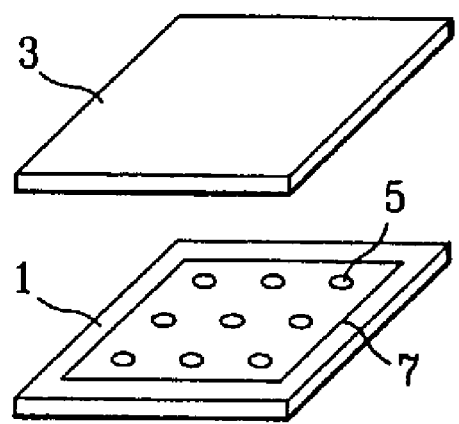
Figure 1C:
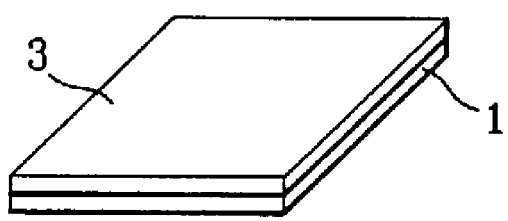
Figure 1D:
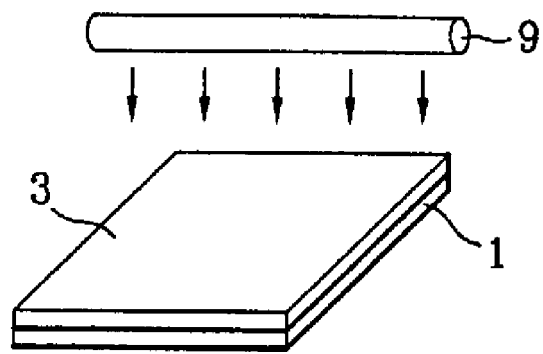
Figure 2A:
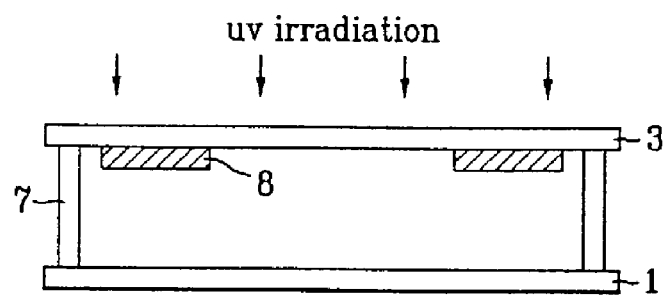
FIGS. 2A to 2D illustrate a difference of a hardening rate of a sealant according to a pattern of a light-shielding layer and the sealant formed on a substrate.
Figure 2B:
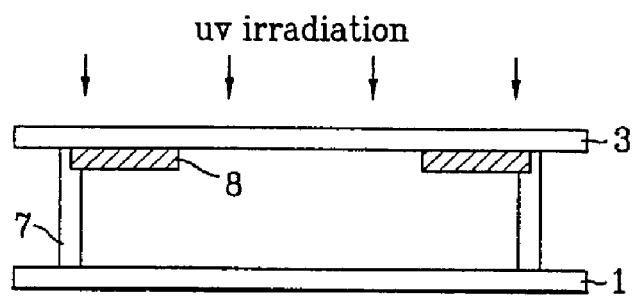
Figure 2C:
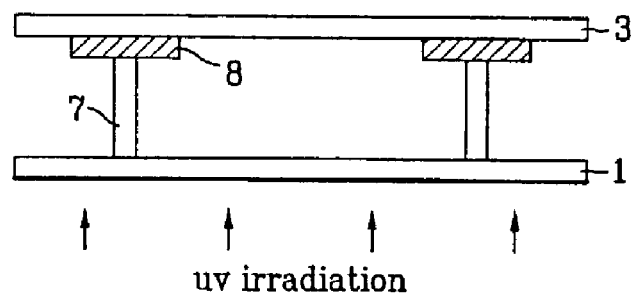
Figure 2D:
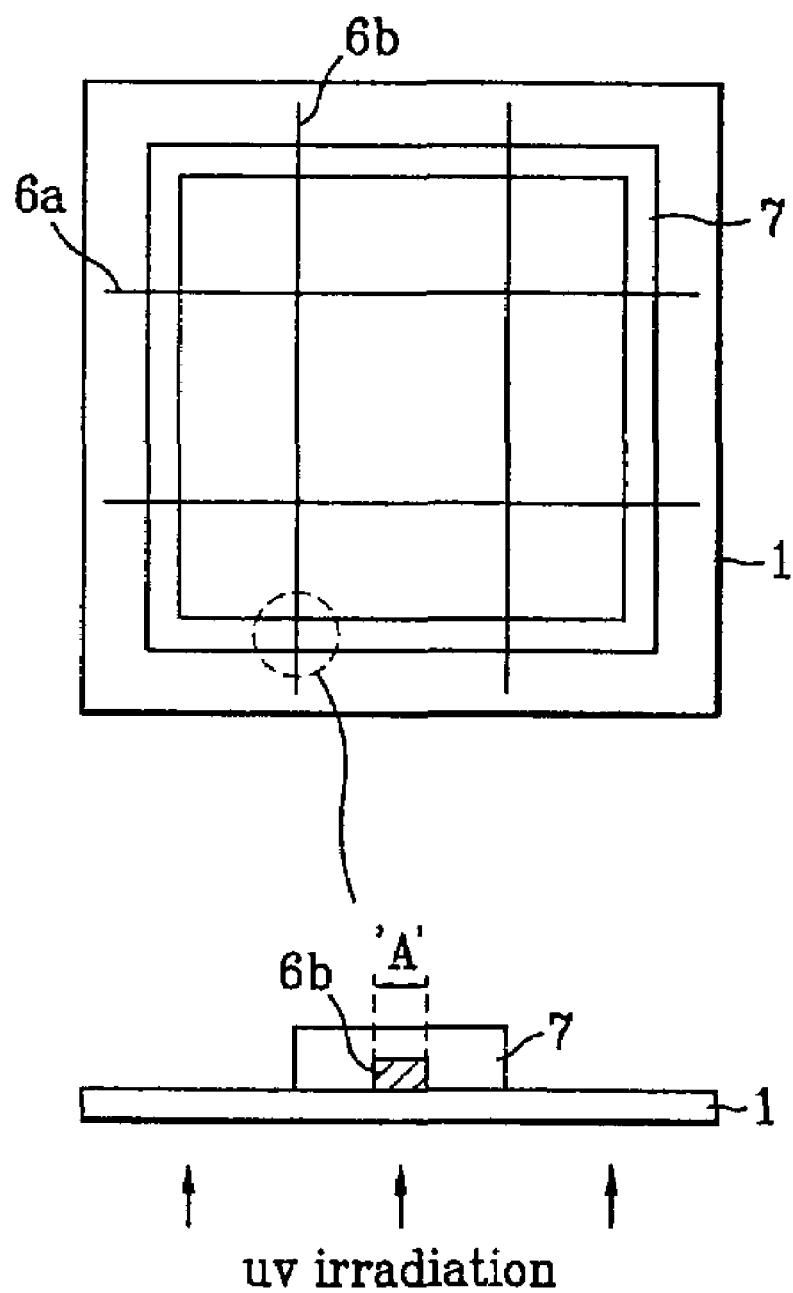
Figure 3:
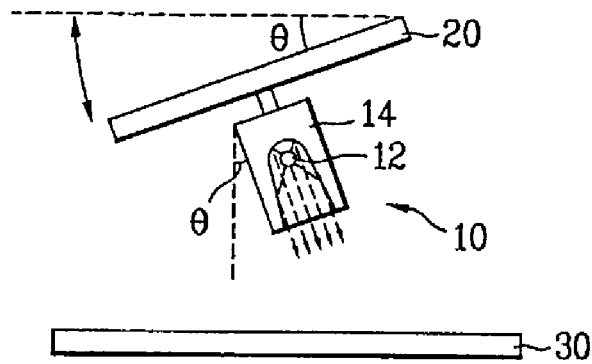
FIG. 3 is a schematic view of a UV irradiating device according to the first embodiment of the present invention.

FIG. 3 is a schematic view of a UV irradiating device according to the first embodiment of the present invention.

As shown in FIG. 3, the UV irradiating device according to the first embodiment of the present invention includes a UV light source 10, a support 20, and a substrate stage 30 on which a substrate to be irradiated with a UV light will be placed. The UV light source 10 includes a UV lamp 12 and a reflecting plate 14 on which the UV lamp 12 is disposed. The support 20 supports the UV light source 10 and is moveable to tilt with respect to a horizontal plane.

At this time, a high pressure mercury UV lamp, metal halide UV lamp, or metal UV lamp may be used as the UV lamp 12.

The reflecting plate 14 shields the UV lamp 12, and an inner reflecting surface on which the UV lamp 12 is placed such that the irradiated UV is reflected in a constant straight line as shown. Therefore, an irradiating angle of the UV light source depends on the tilt angle of the UV light source 10.

The support 20 is driven to tilt with respect to a horizontal plane around a driving axis. The tilt angle $\theta_1$ of the support 20 is within the range of 0° to 90°.

Therefore, if the tilt angle θ of the support 20 is changed, the UV light source from the UV light source 10 is irradiated at an angle of θ with respect to a vertical plane.

Although the support 20 is shown at an angle of $\theta_1$ with respect to the horizontal plane, the support 20 may be driven upwardly at an angle of $-\theta_1$. Alternatively, the driving axis of the support 20 may be changed from right of the support 20 to left of the support 20 or may be formed at the center of the support 20, or at any other location along the support 20.

The substrate stage 30 is horizontal to receive an attached substrate to which a sealant has been applied. Also, for mass production, the substrate stage 30 may be formed to move by means of a conveyer belt.

Meanwhile, if the substrate is large, it may be difficult for one UV light source 10 to uniformly irradiate UV the whole substrate. Accordingly, a UV irradiating device provided with a plurality of UV light sources may be required.

Figure 4A:
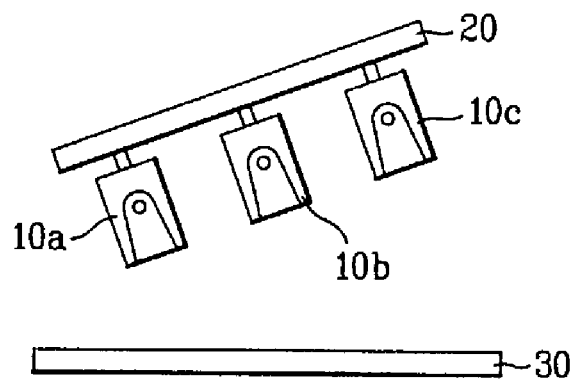
FIGS. 4A and 4B are schematic views of another UV irradiating device according to the first embodiment of the present invention.
Figure 4B:
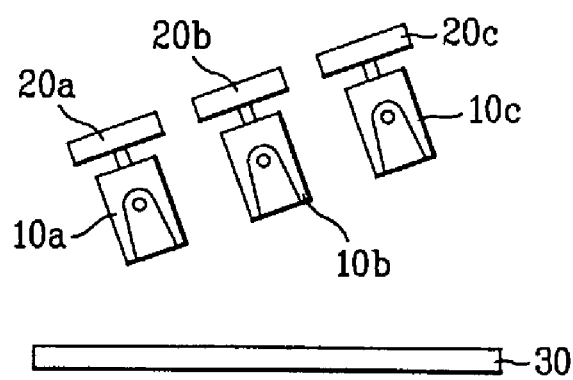

FIGS. 4A and 4B are schematic views of a UV irradiating device provided with a plurality of UV light sources. As shown in FIG. 4A, a plurality of UV light sources 10a, 10b, and 10c may be supported by one support 20. As shown in FIG. 4B, the UV light sources 10a, 10b, and 10c may respectively be supported by respective supports 20a, 20b, and 20c.

In case of FIG. 4A, the distance between each respective light source 10a, 10b, and 10c of the UV irradiating device and the substrate may differ. Thus, the intensity of irradiation from the respective UV light sources onto the substrate surface, and thus onto the sealant to be cured, may differ. In case of FIG. 4B, the distance between each respective UV light source 10a, 10b, and 10c and the substrate may be the same, and, thus, the irradiating characteristics of the UV light from the respective UV light sources 10a, 10b, and 10c may be the same.

Figure 5:
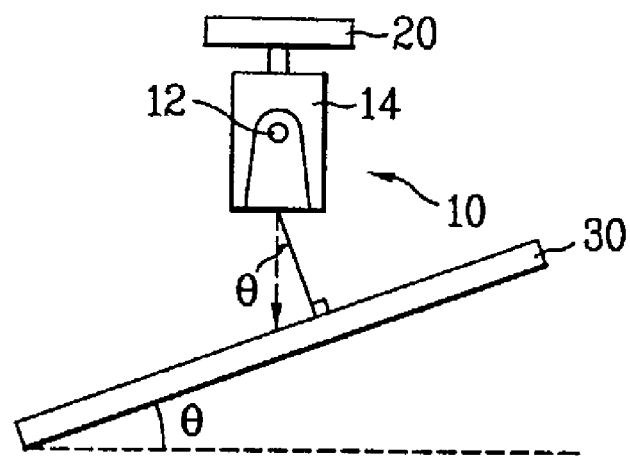
FIG. 5 is a schematic view of a UV irradiating device according to the second embodiment of the present invention.

FIG. 5 is a schematic view of a UV irradiating device according to the second embodiment of the present invention.

As shown in FIG. 5, the UV irradiating device according to the second embodiment of the present invention includes a UV light source 10, a support 20, and a substrate stage 30. The UV light source 10 includes a UV lamp 12 and a reflecting plate 14 on which the UV lamp 12 is disposed. The support 20 supports the UV light source 10 and is horizontal in a fixed state. A substrate to be irradiated with UV light will be placed on the substrate stage 30. The substrate stage 30 is moveable to tilt with respect to a horizontal plane.

In other words, in the UV irradiating device according to the second embodiment of the present invention, the substrate stage 30 is moveable at a tilt angle instead of the support 20 so that a UV light is irradiated upon the substrate stage 30 at a tilt angle.

A high pressure mercury UV lamp, metal halide UV lamp, or metal UV lamp may be used as the UV lamp 12. The reflecting plate 14 shields the UV lamp 12, and an inner reflecting surface on which the UV lamp 12 is placed is formed such that the irradiated UV is reflected in a constant straight line or collimated.

The support 20 is horizontally placed in a fixed state. Accordingly, the UV light source is vertically irradiated from the UV light source part 10.

The substrate stage 30 is driven to tilt with respect to a horizontal plane around a driving axis. The tilt angle θ of the substrate stage 30 is within the range of 0° to 90°.

Therefore, if the tilt angle θ of the substrate stage 30 is changed, the UV light source from the UV light source part 10 is irradiated at a tilt angle of θ with respect to a vertical plane of the substrate stage 30.

Although the substrate stage 30 is shown at an angle of θ with respect to the horizontal plane, the substrate stage 30 may be driven downwardly at an angle of −θ. Alternatively, the driving axis of the substrate stage 30 may be changed from right of the substrate stage 30 to left of the substrate stage 30 or may be formed at the center of the substrate stage 30 or at any other location along the substrate stage 30.

A plurality of UV light sources can be used for a large substrate so that a large area of the substrate may be irradiated simultaneously.

Figure 6:
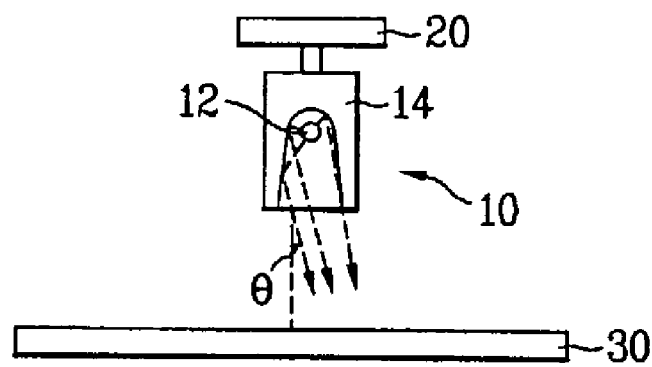
FIG. 6 is a schematic view of a UV irradiating device according to the third embodiment of the present invention.

FIG. 6 is a schematic view of a UV irradiating device according to the third embodiment of the present invention.

As shown in FIG. 6, the UV irradiating device according to the third embodiment of the present invention includes a UV light source 10, a support 20, and a substrate stage 30. The UV light source 10 includes a UV lamp 12 and a reflecting plate 14 on which the UV lamp 12 is disposed. Also, the reflecting plate 14 is formed such that a UV light source is irradiated at a tilt angle θ with respect to a vertical plane. The support 20 supports the UV light source 10. A substrate to be irradiated with a UV light source will be placed on the substrate stage 30.

In other words, in the UV irradiating device according to the third embodiment of the present invention, the support 20 and the substrate stage 30 are fixed in horizontal plane (or two parallel planes), and an inner reflecting surface of the reflecting plate 14 is formed so that UV reflected on the reflecting plate 14 is irradiated onto the substrate at a tilt angle.

A high pressure mercury UV lamp, metal halide UV lamp, or metal UV lamp may be used as the UV lamp 12. The substrate stage 30 may be moveable in the horizontal plane or moveable to be tilted with respect to the horizontal plane.

Since the inner reflecting surface of the reflecting plate 14 is formed such that the irradiated UV is reflected at a tilt angle, the UV light from the UV light source 10 is irradiated at a tilt angle of θ against a vertical plane of the substrate stage 30 (e.g., at an angle of 90°−θ with respect to a horizontal plane if the substrate stage 30 is in the horizontal plane). At this time, the tilt angle of θ can be adjusted by varying a shape of the inner reflecting surface of the reflecting plate 14.

FIGS. 7A to 7D are perspective views illustrating an embodiment of a method of manufacturing an LCD device in accordance with the principles of the present invention.

Although the drawings illustrate only one unit cell, a plurality of unit cells may be formed depending upon the size of the substrate.

Figure 7A:
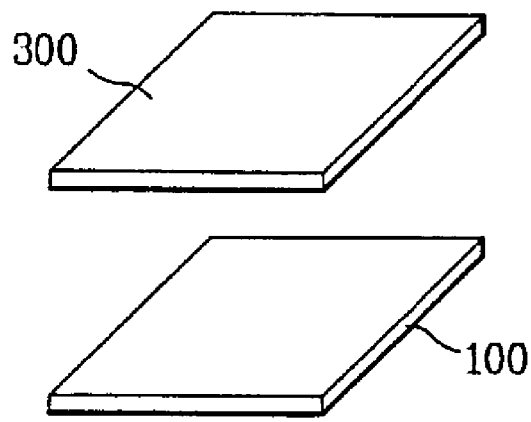
FIGS. 7A to 7D are perspective views illustrating a method of manufacturing an LCD device in accordance with the principles of the present invention.

Referring to FIG. 7A, a lower substrate 100 and an upper substrate 300 are prepared. A plurality of gate and data lines (not shown) are formed on the lower substrate 100. The gate lines cross the data lines to define a pixel region. A thin film transistor (not shown) having a gate electrode, a gate insulating layer, a semiconductor layer, an ohmic contact layer, source/drain electrodes, and a protection layer is formed at a crossing point of the gate lines and the data lines. A pixel electrode (not shown) connected with the thin film transistor is formed in the pixel region.

An alignment film (not shown) is formed on the pixel electrode for initial alignment of the liquid crystal. The alignment film may be formed of polyamide or polyimide based compound, polyvinylalcohol (PVA), and polyamic acid by rubbing. Alternatively, the alignment film may be formed of a photosensitive material, such as polyvinvylcinnamate (PVCN), polysilioxanecinnamate (PSCN) or cellulosecinnamate (CelCN) based compound, by using photo-alignment method.

A light-shielding layer (not shown) is formed on the upper substrate 300 to shield light leakage from the gate lines, the data lines, and the thin film transistor regions. A color filter layer (not shown) of R, G, and B is formed on the light-shielding layer. A common electrode (not shown) is formed on the color filter layer. Additionally, an overcoat layer (not shown) may be formed between the color filter layer and the common electrode. The alignment film is formed on the common electrode.

Silver (Ag) dots (not shown) are formed outside the lower substrate 100 to apply a voltage to the common electrode on the upper substrate 300 after the lower and upper substrates 100 and 300 are bonded to each other. Alternatively, the silver dots may be formed on the upper substrate 300.

In an in plane switching (IPS) mode LCD, the common electrode is formed on the lower substrate like the pixel electrode so that an electric field can be horizontally induced between the common electrode and the pixel electrode. In such case, the silver dots are not formed on the substrates.

Figure 7B:
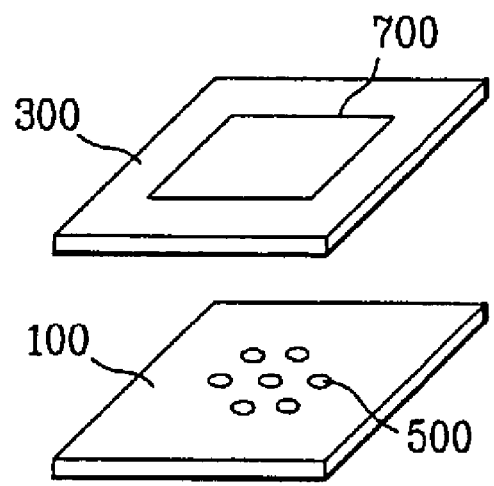

Referring to FIG. 7B, a UV sealant 700 is formed on one of the lower and upper substrates 100 and 300, and a liquid crystal 500 is applied on one of the lower and upper substrates 100 and 300. In more detail, the liquid crystal 500 is applied on the lower substrate 100 to form a liquid crystal layer, and the UV sealant 700 is formed on the upper substrate 300. However, the liquid crystal 500 may be formed on the upper substrate 300, or the UV sealant 700 may be formed on the lower substrate 100.

Alternatively, both the liquid crystal 500 and the UV sealant 700 may be formed on one substrate. However, in this case, there is an imbalance between the processing times of the substrate with the liquid crystal and the sealant and the substrate without the liquid crystal and the sealant. For this reason, the manufacturing process time increases. Also, in the case that the liquid crystal and the sealant are formed on one substrate, the substrate may not be cleaned even if the sealant is contaminated before the substrates are bonded to each other.

Accordingly, a cleaning process for cleaning the upper substrate 300 may additionally be provided before the bonding process after the UV sealant 700 is formed on the upper strate 300.

At this time, monomers or oligomers each having both ends coupled to the acrylic group, mixed with an initiator are used as the UV sealant 700. Alternatively, monomer or oligomers each having one end coupled to the acrylic group and the other end coupled to the epoxy group, mixed with an initiator are used as the UV sealant 700. Such a UV sealant 700 is formed in a closed pattern by using a dispensing method or a screen printing method.

The liquid crystal 500 may be contaminated if it comes into contact with the sealant 700 before the sealant 700 is hardened. Accordingly, the liquid crystal 500 may preferably be applied on the central part of the lower substrate 100. In this case, the liquid crystal 500 is gradually spread even after the sealant 700 is hardened. Thus, the liquid crystal 500 is uniformly distributed on the surface of the substrate.

Meanwhile, spacers may be formed on either of the two substrates 100 and 300 to maintain a cell gap. Preferably, the spacers may be formed on the upper substrate 300.

Ball spacers or column spacers may be used as the spacers. The ball spacers may be formed in such a manner that they are mixed with a solution having an appropriate concentration and then spread at a high pressure onto the substrate from a spray nozzle. The column spacers may be formed on portions of the substrate corresponding to the gate lines or data lines. Preferably, the column spacers may be used for the large sized substrate since the ball spacers may cause an uneven cell gap for the large sized substrate. The column spacers may be formed of a photosensitive organic resin.

Figure 7C:
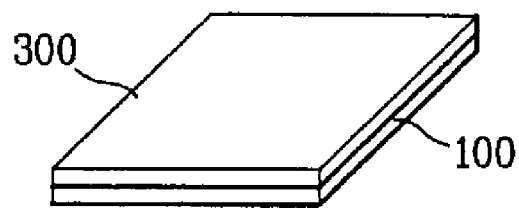

Referring to FIG. 7C, the lower substrate 100 and the upper substrate 300 are attached to each other by the following processes. First, one of the substrates having the liquid crystal applied thereon is placed at the lower side. The other substrate is turned by 180 degrees, e.g. flipped so that layers on the upper substrate face the substrate layers on the lower side, and so that the upper substrate is above the lower substrate. Thereafter, the substrate at the upper side is pressed, so that both substrates are attached to each other. Alternatively, the space between the substrates may be maintained under the vacuum state so that both substrates are attached to each other by releasing the vacuum state.

Figure 7D:
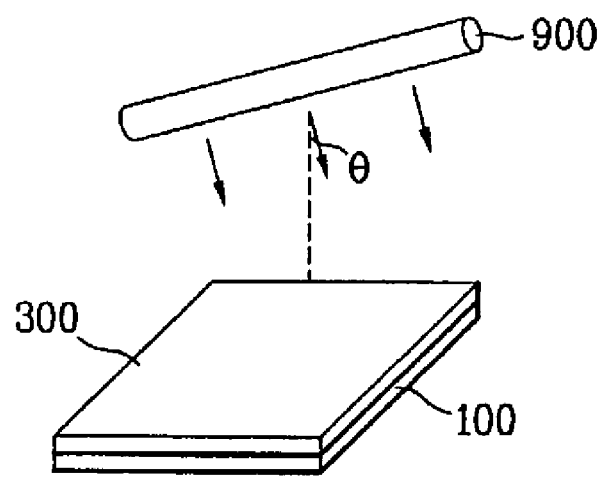

Then, referring to FIG. 7D, the attached substrate is horizontally arranged and a UV light source 900 is irradiated at a tilt angle of θ with respect to a plane vertical to the substrate. Various light irradiating devices as described in the first and third embodiments may be used to irradiate the UV light source 900 at a tilt angle.

Although the UV light source 900 has been formed above the attached substrate in the drawing, it may be formed below the attached substrate. The upper substrate surface or the lower substrate surface of the attached substrate may be used as a UV irradiating surface of the UV light source.

Upon irradiating the UV, monomers or oligomers activated by an initiator constituting the UV sealant are polymerized and hardened, thereby bonding the lower substrate 100 to the upper substrate 300. If the UV is irradiated at a tilt angle with respect to the substrate, the sealant is hardened even if a light-shielding layer or a metal line layer overlaps the UV sealant. Thus, adherence between the substrates is not comprised.

If monomers or oligomers each having one end coupled to the acrylic group and the other end coupled to the epoxy group, mixed with an initiator are used as the UV sealant 700, the epoxy group is not completely polymerized. Therefore, the sealant may have to be additionally heated at about 120° C. for one hour after the UV irradiation, thereby hardening the sealant completely.

Figures 8A, 8B:
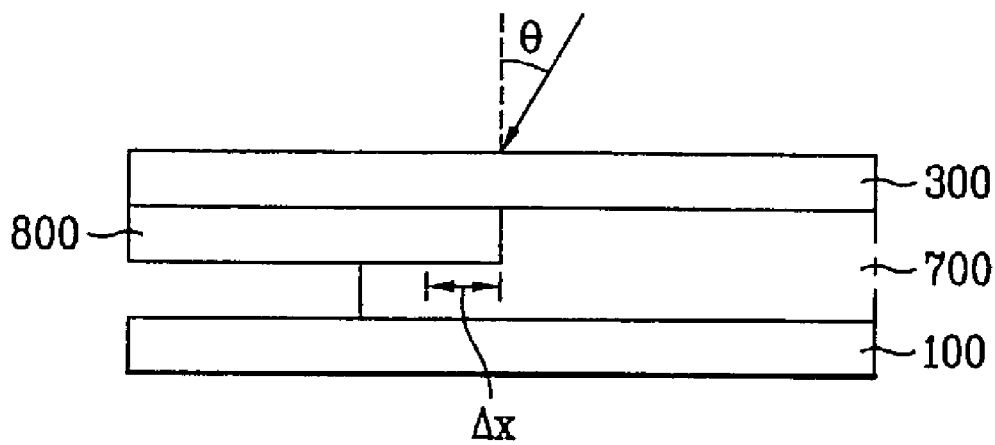
FIG. 8A is a sectional view illustrating a process of irradiating UV light at a tilt angle θ upon an attached substrate having a light-shielding layer overlapped on a sealant.
FIG. 8B is a table illustrating a hardening rate of the sealant according to a change of a tilt angle of θ.

Meanwhile, FIG. 8A is a sectional view illustrating a process of irradiating UV upon an attached substrate having a light-shielding layer 800 overlapping a sealant 700 at a tilt angle of θ with respect to a plane vertical to the substrate, and FIG. 8B is a table illustrating a hardening rate of the sealant 700 according to a change of a tilt angle of θ.

As will be aware of it from FIG. 8B, when the tilt angle of θ is within the range of 30° to 60°, the hardening rate of the sealant 700 is 80% or greater. To compensate for angular shadows that may prevent some sections of the sealant 700 from hardening completely or to a maximum possible extend, the UV light may be applied over a range of angle from 0°-90° or 0°-180° or any suitable range, either discretely or continuously.

Although not shown, the process of cutting a substrate into a unit cell after the UV irradiation and the final test process are performed.

In the cutting process, a cutting line is formed on a surface of the substrates with a pen or wheel of a material having hardness higher than that of glass, e.g., diamond (scribing process), and then the substrate is cut along the cutting line by mechanical impact (breaking process). Alternatively, the scribing process and the breaking process may simultaneously be performed using a pen or wheel of a the high hardness material having a toothed shape.

The final test process is to check whether there are any defects before a unit cell is assembled into a liquid crystal module. In the final test process, the liquid crystal module is tested to determine whether each pixel is driven properly when a voltage is applied or no voltage is applied.

FIGS. 9A to 9D are perspective views illustrating a method of manufacturing an LCD device according to principles of the present invention.

Figure 9A:
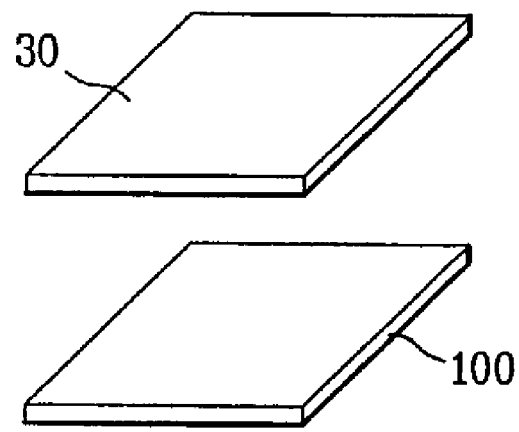
FIGS. 9A to 9D are perspective views illustrating a method of manufacturing an LCD device according to the fifth embodiment of the present invention.
Figure 9B:
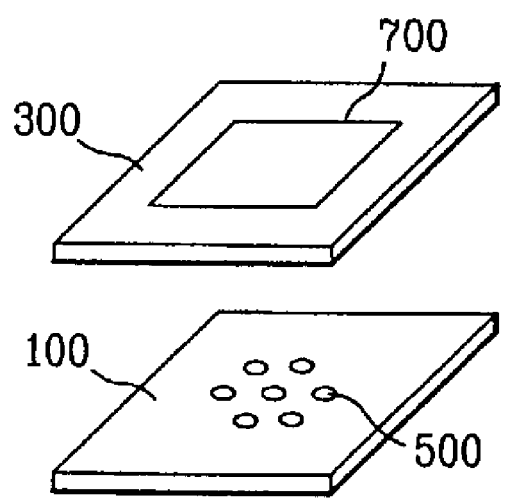
Figure 9C:
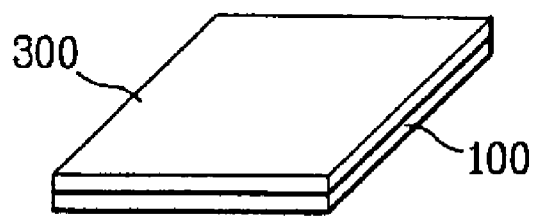
Figure 9D:
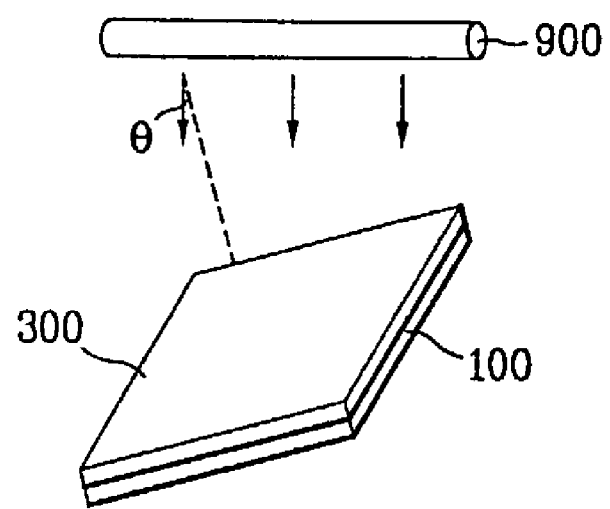

As shown in FIG. 9A, a lower substrate 100 and an upper substrate 300 are prepared. As shown in FIG. 9B, a UV sealant 700 is formed on the upper substrate 300, and a liquid crystal is applied on the lower substrate 100. As shown in FIG. 9C, the lower substrate 100 and the upper substrate 300 are attached to each other. As shown in FIG. 9D, the attached substrates are located tilt and a UV light source 900 is vertically irradiated upon the attached substrates.

The present embodiment is similar to the previous embodiment of the method except for the UV irradiation process. That is, according to the present embodiment unlike the previous embodiment, the attached substrates are placed at a tilt angle and the UV is vertically irradiated.

To tilt the attached substrate, a light irradiating device according to the second embodiment can be used.

Since the other elements of the present embodiment are identical to those of the previous embodiment, the same reference numerals will be given to the same elements and their detailed description will be omitted.

FIGS. 10A to 10D are perspective views illustrating another embodiment of the method of irradiating UV in manufacturing an LCD device according to the present invention.

In the UV irradiation, if UV is irradiated upon the entire surface of the attached substrate, the UV may deteriorate characteristics of devices such as a thin film transistor on the substrate or may change a pre-tilt angle of an alignment film formed for the initial alignment of the liquid crystal.

Therefore, in the present embodiment of the present invention shown in FIGS. 10A to 10D, UV light is irradiated at a tilt angle and areas where the sealant is not formed are covered with a mask.

Figure 10A:
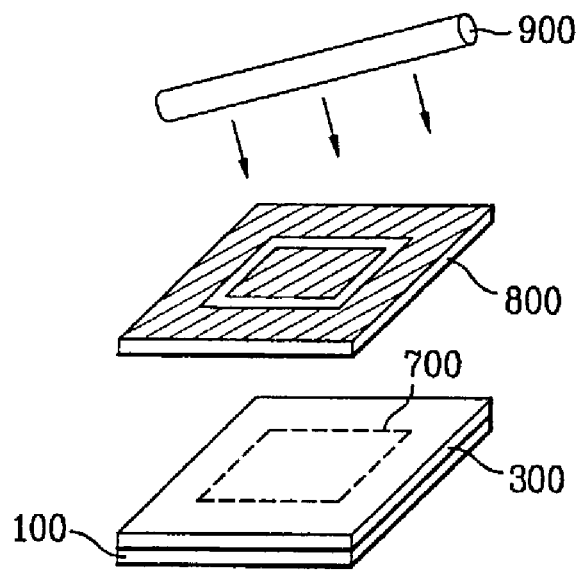
FIGS. 10A to 10D are perspective views illustrating a process of irradiating UV in the method of manufacturing an LCD device according to the sixth embodiment of the present invention.

Referring to FIG. 10A, the attached substrates are placed in a horizontal direction, and a mask 800 that covers the area where the sealant 700 is not formed is placed in parallel with the attached substrates. The UV light source 900 is then irradiated at a tilt angle.

At this time, it is preferable that the distance between the surface of the attached substrates and the mask 800 is within the range of 1 mm to 5 mm.

Figure 10B:
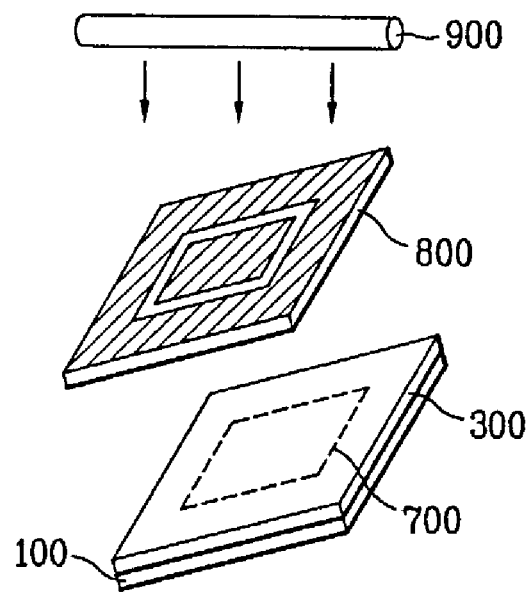

Referring to FIG. 10B, the attached substrates are tilted, and the mask 800 that covers the area where the sealant 700 is not formed is placed in parallel with the attached substrates. The UV light source 900 is vertically irradiated.

Figure 10C:
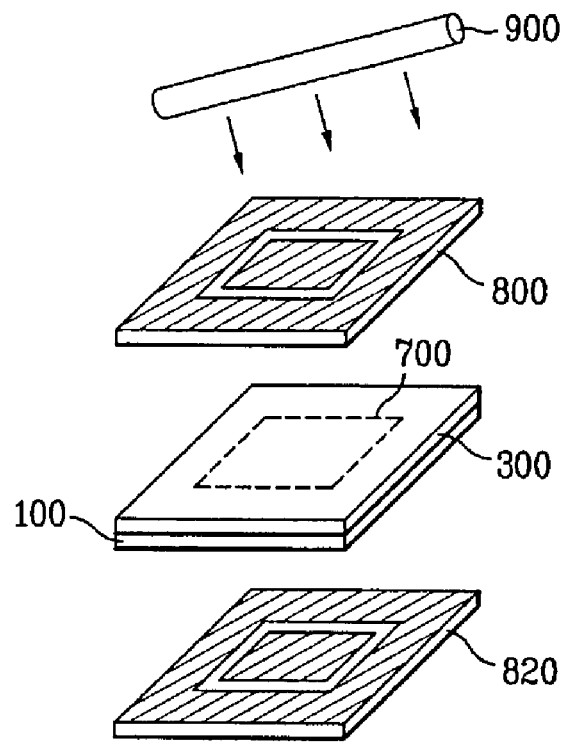

Referring to FIG. 10C, masks 800 and 820 that cover the area that lacks the sealant 700 are formed at upper and lower sides of the attached substrates. In FIG. 10C, the attached substrates and the masks 800 and 820 are placed in a horizontal direction while the UV light source 900 is irradiated at a tilt angle. The attached substrates and the masks 800 and 820 may be tilted while the UV light source 900 may vertically be irradiated.

Once the masks 800 and 820 are formed at upper and lower sides of the attached substrates, the irradiated UV light is reflected so that the UV light is prevented from being irradiated upon the area lacking the sealant.

Figure 10D:
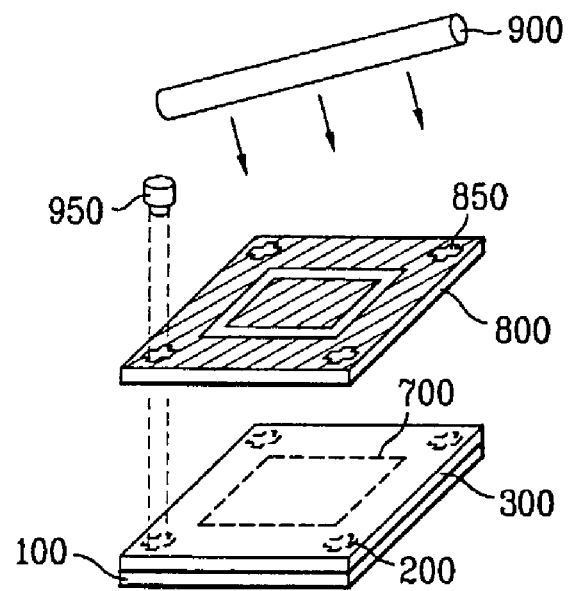

Referring to FIG. 10D, alignment marks 200 and 850 are formed in the attached substrates and the mask 800 to accurately cover the area lacking the sealant 700. The position of the attached substrates and the mask 800 is adjusted by a camera 950 checking the alignment marks 200 and 850.

The alignment mark 200 of the attached substrates may be formed on either the upper substrate 300 or the lower substrate 100 of the attached substrates.

Referring to FIG. 10D, although the attached substrates and the mask 800 are placed horizontally while the UV light source 900 is irradiated at a tilt angle, the attached substrates and the mask 800 may be tilted while the UV light source 900 may vertically be irradiated. The masks with alignment marks may respectively be formed at upper and lower sides of the attached substrates.

Figure 11:
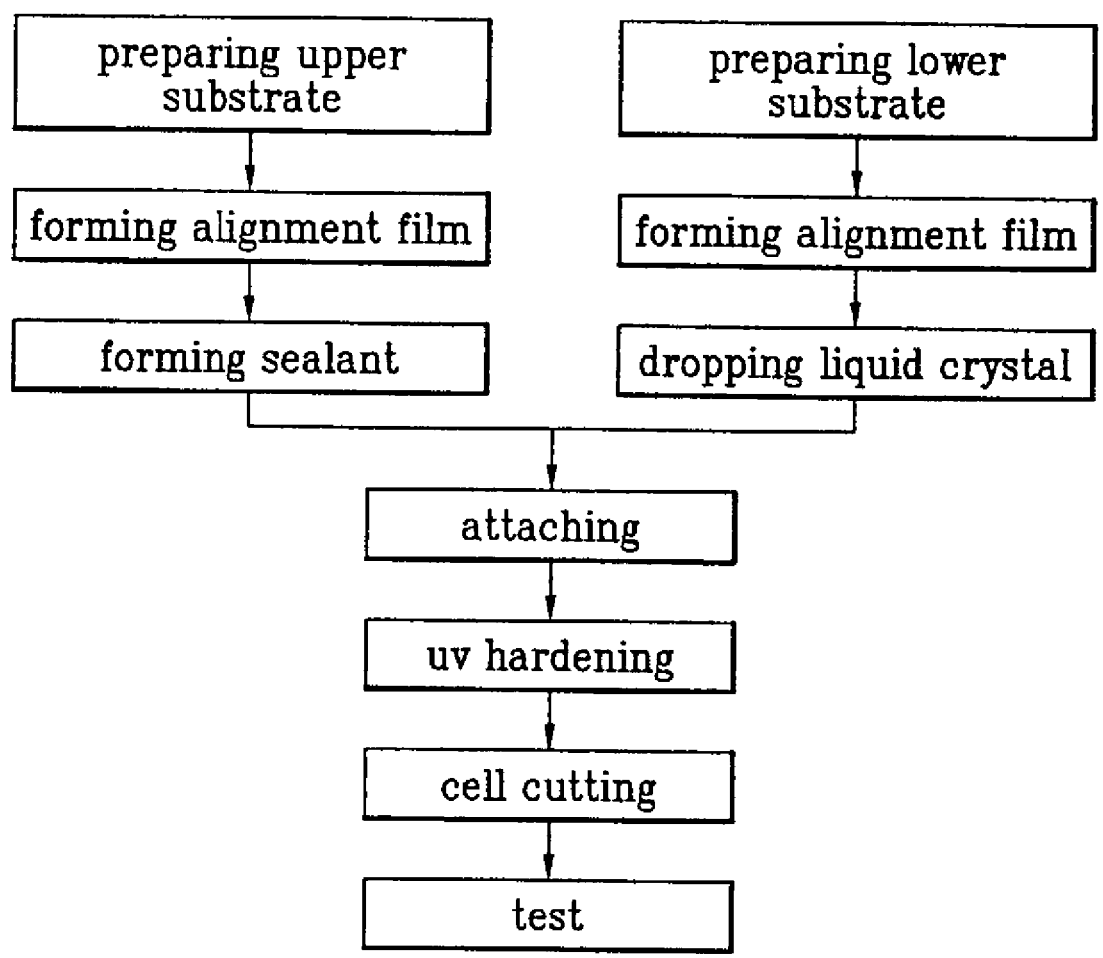
FIG. 11 is a layout illustrating a method of manufacturing an LCD according to the present invention.

FIG. 11 is a flowchart illustrating a method of manufacturing an LCD according to the present invention.

As shown in FIG. 11, an upper substrate is prepared and an alignment film is formed thereon. A sealant is then formed on the alignment film, thereby completing the upper substrate. Also, a lower substrate is prepared and an alignment film is formed thereon. A liquid crystal is then applied on the alignment film, thereby completing the lower substrate. At this time, the process of manufacturing the upper substrate and the process of manufacturing the lower substrate are simultaneously performed. The liquid crystal and the sealant may selectively be formed on the substrate.

Afterwards, the completed upper and lower substrates are attached to each other. The UV light is then irradiated to harden the sealant, thereby bonding the substrates. The substrates are cut into unit cells, and the final test process is performed, thereby completing one liquid crystal cell.

As aforementioned, the method of manufacturing an LCD according to the present invention has the following advantages.

The UV light is irradiated at a tilt angle upon the substrates where the UV sealant is formed. The sealant can thus be hardened even if the light shielding layer or the metal line layer is formed between the UV-irradiating surface and the sealant.

In addition, since the UV light is irradiated upon the substrate at a tilt angle in a state that the region where the sealant is not formed is covered with the mask, it is possible to prevent the thin film transistor or the alignment film formed on the substrate from being damaged.

Furthermore, since the substrate stage on which the attached substrates are placed is movably formed, yield is improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A Liquid Crystal Display (LCD) manufacturing system including a UV irradiating device, comprising:
   at least one UV light source having a reflecting plate and a UV lamp disposed on an inner reflecting surface of the reflecting plate;
   a stage that supports substrates attached by a sealant to be irradiated with a UV light source, the stage being capable of tilting with respect to a horizontal plane;
   a mask arranged in parallel with the attached substrates on the stage,
   wherein the UV light source irradiates the light at a vertical direction with respect to the horizontal plane,
   wherein the stage and the mask are arranged in parallel to tilt with respect to a horizontal plane while light from a UV light source of the at least one UV light source is irradiated into the sealant in the attached substrates through the mask, and
   wherein the mask is open in a first region in which the sealant is formed and covers a second region in which the sealant is not formed.

2. The liquid crystal display manufacturing system of claim 1, wherein the at least one UV light source includes a plurality of UV light sources.

3. The liquid crystal display manufacturing system of claim 2, wherein the plurality of UV light sources are supported by a single support.

4. The liquid crystal display manufacturing system of claim 2, wherein the plurality of UV light sources are supported by a plurality of supports.

5. The liquid crystal display manufacturing system of claim 1 wherein the stage has a tilt angle of about 30 degrees to 60 degrees.

6. A method of manufacturing a liquid crystal display device comprising:
   preparing lower and upper substrates;
   forming a sealant on one of the lower and upper substrates;
   applying a liquid crystal on one of the lower and upper substrates;
   attaching the lower and upper substrates to each other;
   arranging the attached substrates to tilt with respect to a horizontal plane;
   arranging a mask in parallel with the attached substrates and tilted with respect to the horizontal plane, wherein the mask is open in a first region in which the sealant is formed and covers a region in which the sealant is not formed; and
   irradiating UV light into the sealant in the attached substrates through the mask so as to cure the sealant,
   wherein the UV light is irradiated at a vertical direction with respect to the horizontal plane, and
   wherein the stage and the mask are arranged in parallel to tilt with respect to the horizontal plane while light is irradiated into the sealant in the attached substrates through the mask.

7. The method of claim 6, further comprising curing the sealant using heat.

8. The method of claim 6, wherein the UV is irradiated at a tilt angle of 30° to 60° with respect to a vertical plane of the tilted stage.

9. The method of claim 6, wherein the mask is placed at one of an upper surface and a lower surface of the attached substrates.

10. The method of claim 6, wherein the mask is placed at upper and lower surfaces of the attached substrates.

11. The method of claim 6, wherein the sealant is formed on the upper substrate and the liquid crystal is applied on the lower substrate.

12. The method of claim 6, wherein the irradiating UV light includes changing a tilt angle of the stage during the irradiating.

13. The method of claim 12, wherein the changing the tilt angle is at a constant rate.

14. The method of claim 12, wherein the tilt angle is changed through a range of angles.

15. The method of claim 13, wherein the range is about 30-60 degrees.

16. The method of claim 6, wherein the sealant is formed on the lower substrate and the liquid crystal is applied on the upper substrate.

17. The method of claim 6, wherein the applying the liquid crystal includes dropping the liquid crystal onto the one of the upper and lower substrates.

18. The method of claim 16, wherein the liquid crystal is dropped in a predetermined pattern onto the one of the upper and lower substrates.

* * * * *